US008637790B2

(12) United States Patent
Harbour et al.

(10) Patent No.: US 8,637,790 B2
(45) Date of Patent: Jan. 28, 2014

(54) FREEZE PREVENTION MOBILE EQUIPMENT SYSTEM

(75) Inventors: Robert Harbour, Springfield, IL (US); Damon Dennis, Pawnee, IL (US)

(73) Assignee: Farm and Ranch Technologies, LLC, Springfield, IL (US)

( * ) Notice: Subject to any disclaimer, the term of this patent is extended or adjusted under 35 U.S.C. 154(b) by 110 days.

(21) Appl. No.: 13/317,490

(22) Filed: Oct. 19, 2011

(65) Prior Publication Data

US 2013/0098889 A1 Apr. 25, 2013

(51) Int. Cl.
*B60L 1/02* (2006.01)

(52) U.S. Cl.
USPC .......... 219/202

(58) Field of Classification Search
USPC .......... 219/202; 404/95, 108
See application file for complete search history.

(56) References Cited

U.S. PATENT DOCUMENTS

| | | | | |
|---|---|---|---|---|
| 4,154,369 | A * | 5/1979 | Morane | 222/147 |
| 4,394,635 | A * | 7/1983 | Foss | 336/55 |
| 2004/0240939 | A1* | 12/2004 | Hays et al. | 404/95 |
| 2007/0181537 | A9* | 8/2007 | Kornrumpf | 219/50 |

* cited by examiner

*Primary Examiner* — Tu B Hoang
*Assistant Examiner* — Lindsey C Teaters
(74) *Attorney, Agent, or Firm* — Law Office of Robert M. Patino

(57) ABSTRACT

A transportable heating assembly for converting a fluid bearing structure on a vehicle into a heatable fluid bearing structure is provided with a relay system for receiving power and distributing electrical currents, a power system for supplying power to the relay system, and at least one heating cable for receiving electrical currents distributed from the relay system.

14 Claims, 11 Drawing Sheets

FREEZE PREVENTION MOBILE EQUIPMENT SYSTEM

BACKGROUND OF THE INVENTION

This invention relates in general to new and useful improvements in mobile outdoor equipment vehicles, such as concrete trucks and other construction vehicles. In particular, this invention relates to preventing fluids carried inside such vehicles from freezing in below freezing ambient conditions. Although this invention is primarily envisioned to prevent the water inside concrete trucks from freezing, other outdoor equipment or fluid bearing structures might employ this invention, such as industrial supply vehicles or non-flammable industrial fluids.

Conventionally, concrete trucks must carry water in their water tanks to thin concrete mix when arriving at a job site. This water is transported through various fittings and hoses within the truck and is also used to wash down the concrete chute when the job is completed. The water in such trucks must be pure and cannot contain additives such as antifreeze, which lower the quality of the concrete product. During winter months when temperatures fall below the freezing point of water, the water inside the trucks can freeze inside the valves, fittings, hoses, and tanks.

To prevent freezing water from damaging concrete trucks, operators must empty the tank and wash down the chute each night. The hoses, valves and fittings must also be drained of water. These tasks waste water and create unsafe conditions for the operators due to the drained water freezing in puddles around the trucks.

Furthermore, man hours are wasted and precious fuel is consumed because water tanks need to be refilled, forcing the truck to leave the site and return the next day. Compensation for the additional man hours spent emptying and filling tanks must be charged to the construction job budget, which increases the overall cost of the job to the client. Wasted water from draining and refilling water tanks also causes a strain on this limited natural resource.

Thermal and insulating jackets have been used to keep the concrete in a workable condition while in the drum through adverse weather conditions. U.S. Pat. Nos. 7,793,691 and 6,264,361 attempt to address the problem of keeping the concrete in a plastic state while in the drum by using an insulator for the drum. However, these issues are different than the problem in keeping the water supply in a liquid state if subjected to below freezing conditions. A solution to this problem could not be found in the prior art as concrete truck operators generally avoid working in these conditions or sacrifice the man hours as described above to complete jobs.

Due to the lack of viable systems to counteract the problem of freezing water in concrete trucks, there remains a need for a heating system that can maintain the temperature of the water inside such concrete trucks above freezing. Such a system will eliminate the man hours wasted in emptying the water from the trucks each night during winter months, which will also eliminate the associated waste of water. A heating system for concrete trucks will also help preserve the safety of the operators by eliminating frozen water puddles around the job site.

BRIEF SUMMARY OF THE INVENTION

The needs identified above are addressed by the present transportable heating assembly for converting a fluid bearing structure on a vehicle into a heatable fluid bearing structure. The transportable heating assembly eliminates the need to empty fluid valves, tanks, fittings, and hoses, which eliminates wasted man hours spent accomplishing such tasks while conserving water resources. The heatable hose assembly also prevents damage to the vehicle tanks, fittings, and hoses by preventing the fluid inside such fixtures from freezing. Finally, eliminating the need to drain fluid from the vehicles each night increases safety to the vehicle operators by preventing the fluid from freezing in unsafe puddles on the ground around the vehicles.

One embodiment of the present invention is a transportable heating assembly for converting a fluid bearing structure on a vehicle into a heatable fluid bearing structure. The transportable heating assembly comprises a relay system for receiving power and distributing electrical currents, a power system for supplying power to the relay system, and at least one heating cable for receiving electrical currents distributed from the relay system.

In another embodiment, the present invention is a heating assembly kit for converting a fluid bearing structure on a vehicle into a heatable fluid bearing structure. The heating assembly kit comprises a relay system for receiving power and distributing electrical currents, a power inverter in an electrical relationship to the relay system, a house power cord in an electrical relationship to the relay system, a first heating cable extending from the relay system configured to heat a fluid holding tank, and a second heating cable extending from the relay system configured to heat a fluid exit line.

DETAILED DESCRIPTION

Figure 1:
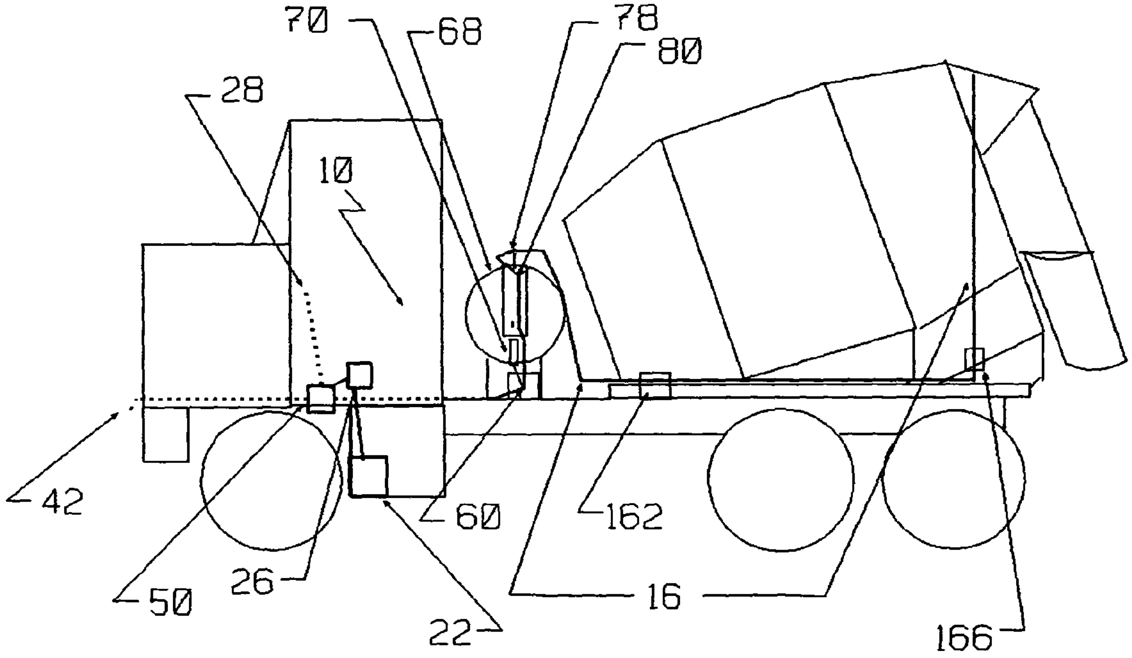
FIG. 1 is a side view showing a transportable heating assembly connected to a concrete truck.

Referring now to FIGS. 1-4, a transportable heating assembly is generally designated 10 and is intended for converting a fluid bearing structure on a vehicle into a heatable fluid bearing structure. The transportable heating assembly 10 generally comprises a relay system 12 for receiving power and distributing electrical currents, a power system 14 for supplying power to the relay system 12, and at least one heating cable 16 for receiving electrical currents distributed from the relay system 12.

The power system 14 may comprise a vehicle power system 18 or a house power system 20. Preferably, the power system 14 comprises both a vehicle power system 18 and a house power system 20.

The vehicle power system 18 includes a vehicle battery 22, a vehicle alternator 24, and a power inverter 26 in an electrical relationship to the relay system 12. In one embodiment, the vehicle battery 22 is first electrically connected to the vehicle alternator 24, which is then electrically connected to both an ignition power line 28 and an inverter power line 30. The ignition power line 28 and the inverter power line 30 are then electrically connected to the relay system 12. The ignition power line 28 includes an ignition key switch 32, which activates the vehicle power system 18 and enables power delivery to the relay system 12 when the vehicle is powered on. The power inverter 26 is electrically connected to the inverter power line 30 and converts direct current (DC) power received from the vehicle alternator 24 into alternating current (AC) power supplied to the relay system 12. The inverter power line 30 includes an ignition switch relay 34 that is closed when the vehicle is powered on, enabling power delivery to the relay system 12, and open when the vehicle is powered off. The inverter power line 30 may further include one or more fuses 36 that will cause failure of the vehicle power system 18 in the case of an unsafe level of current in the inverter power line 30.

The power inverter 26 may include an integrated inverter ground fault circuit interrupter (GFCI) 38 having an inverter GFCI functionality indicator 40. The inverter GFCI 38 breaks the electrical circuit within the vehicle power system 18 in the event of a broken wire, exposed live electrical wire, or other unsafe electrical condition. The inverter GFCI functionality indicator 40 indicates when power is being supplied through the vehicle power system 18 and may be a light, alarm, visual display window, or other similar indicator apparatus. The power inverter 26 may optionally be configured with a standard manual power switch (not shown) to enable the user to manually switch the power inverter 26 on or off.

The power inverter 26 may be of various ratings to supply sufficient power to the transportable heating assembly 10, but is most preferably a 1,000 Watt, 12 Volt direct current (DC) to 120 Volt alternating current (AC) inverter.

The house power system 20 includes a house power cord 42 electrically connected to the relay system 12. The house power cord 42 is most preferably standard two-wire grounded, insulated electrical wire. The standard two-wire grounded, insulated electrical wire may be of various gauges and ratings, but is most preferably #16 stranded copper wire rated for 120 volt service. The house power cord 42 includes a standard grounded electrical plug 44. The standard grounded electrical plug 44 is insertable into any standard grounded electrical supply receptacle. The house power cord 42 may further include an integrated house power ground fault circuit interrupter (GFCI) 46 having a house power GFCI functionality indicator 48. The house power GFCI 46 breaks the electrical circuit within the house power system 20 in the event of a broken wire, exposed live electrical wire, or other unsafe electrical condition. The house power GFCI functionality indicator 48 indicates when power is being supplied through the house power system 20 and may be a light, alarm, visual display window, or other similar indicator apparatus.

The relay system 12 is configured to receive power from the vehicle power system 18 or the house power system 20. The relay system 12 may also receive power from both the vehicle power system 18 and the house power system 20 simultaneously.

Figure 2:
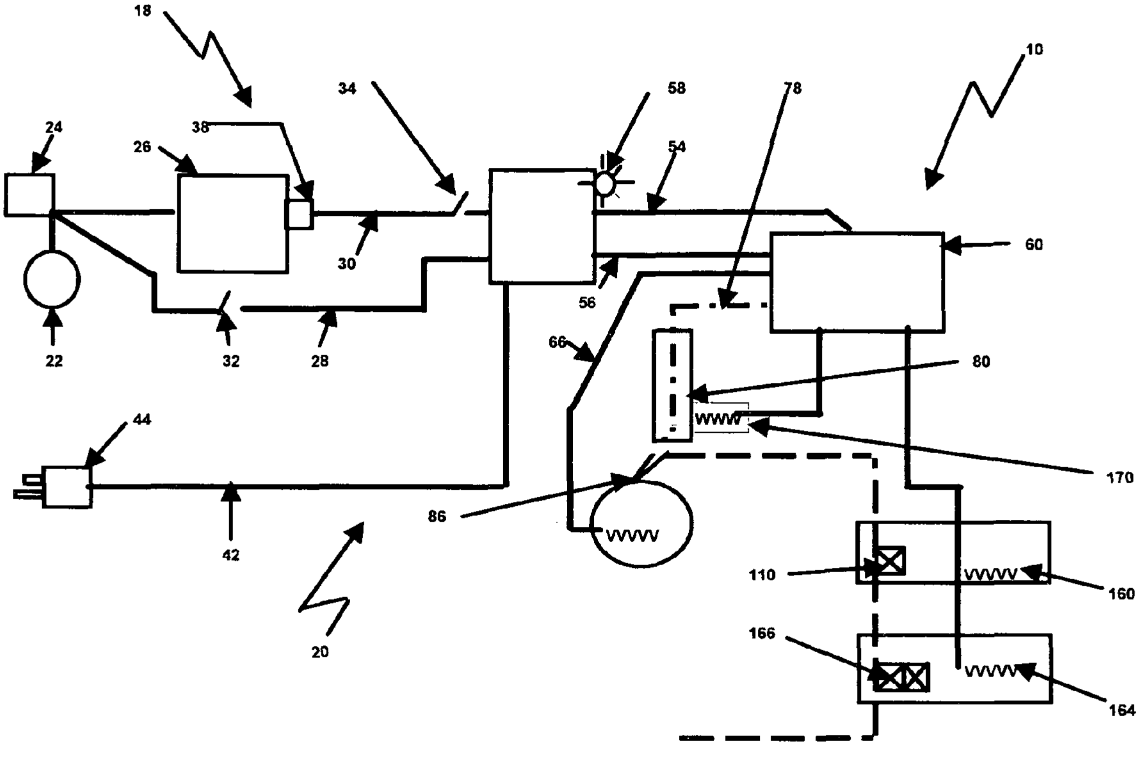
FIG. 2 is a block electrical diagram showing the elements of the transportable heating assembly connected.
Figure 3:
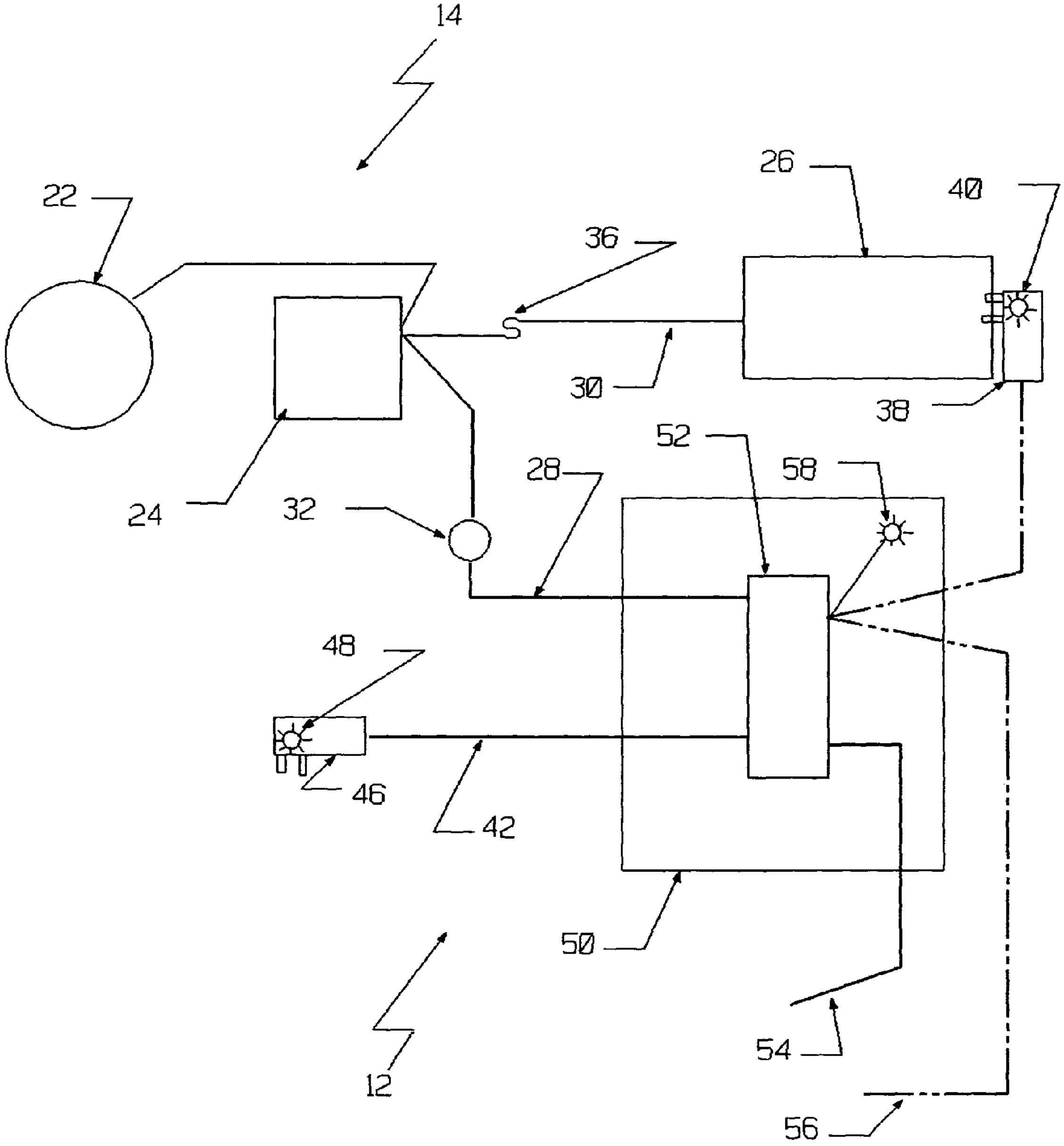
FIG. 3 is a block diagram showing a power system and components of a relay junction box.
Figure 4:
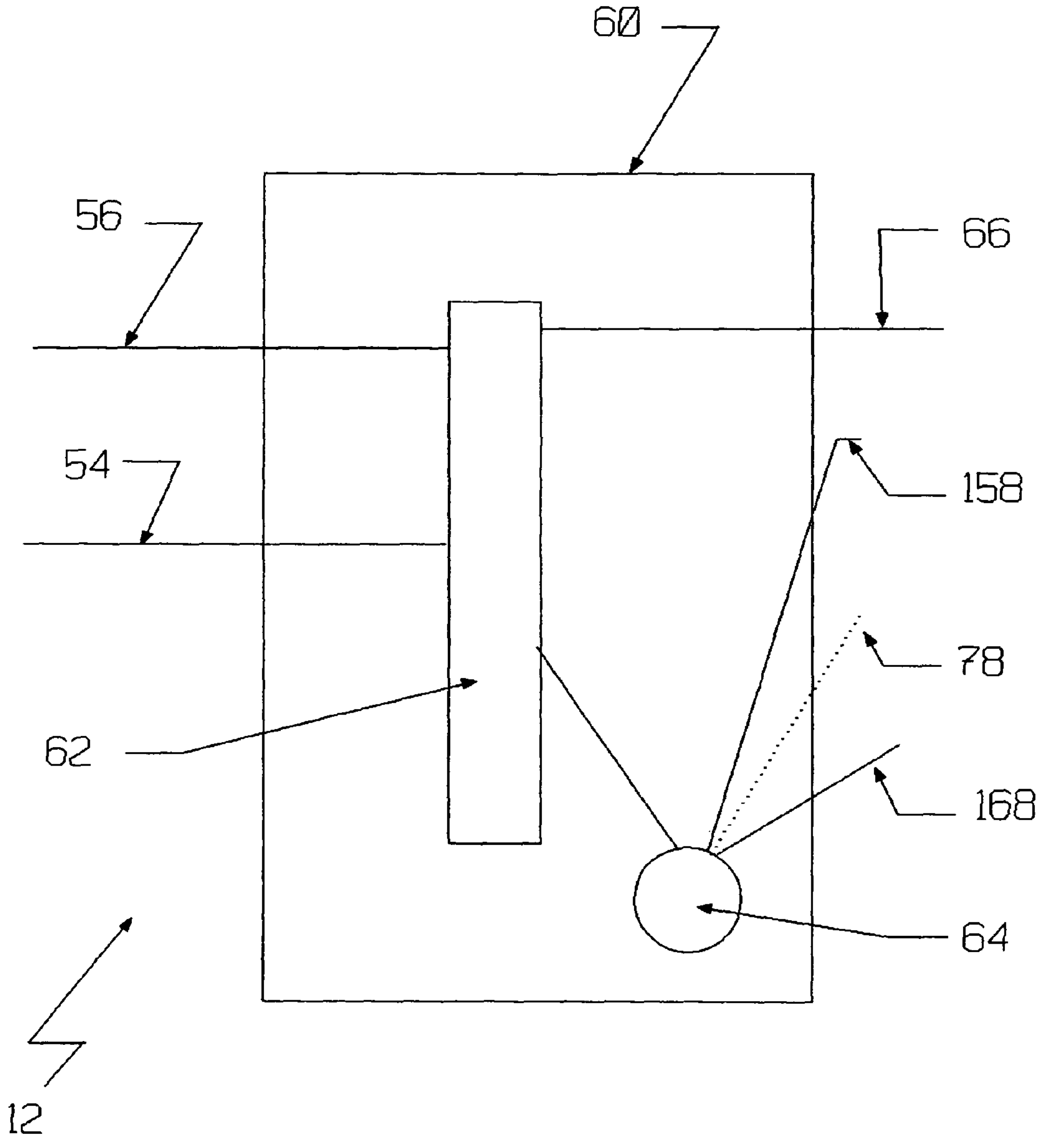
FIG. 4 is a block diagram showing a secondary junction box.

Referring now to FIGS. 2-4, the relay system 12 includes a relay junction box 50 in electrical relationship to the power system 14. The relay junction box 50 may be constructed of any durable, weather-resistant material, but is most preferably a plastic material. The relay junction box 50 includes a relay terminal strip 52, which is electrically connected to the ignition power line 28, the inverter power line 30, and the house power cord 42. The relay system 12 further includes a first relay output power line 54 and a second relay output power line 56. The first relay output power line 54 and the second relay output power line 56 are electrically connected to the relay terminal strip 52. The first relay output power line 54 and the second relay output power line 56 are most preferably standard two-wire grounded, insulated electrical wire. The standard two-wire grounded, insulated electrical wire may be of various gauges and ratings, but is most preferably #16 stranded copper wire rated for 120 volt service.

The relay junction box 50 may further include a relay box power active indicator 58, which indicates whether the relay system 12 is receiving power from the power system 14. The relay box power active indicator 58 is electrically connected to the relay terminal strip 52 and may be a light, alarm, visual display window, or other similar indicator apparatus. The relay junction box 50 may also include a hinged door for easy access by the vehicle operator. In an alternate embodiment, the first relay output power line 54 and the second relay output power line 56 may be combined into a single relay output power line.

The relay system 12 also includes a secondary junction box 60 in electrical relationship to the relay junction box 50. The secondary junction box 60 may be constructed of any durable, weather-resistant material, but is most preferably a plastic material. The secondary junction box 60 includes a secondary terminal strip 62 electrically connected to the first relay output power line 54 and the second relay output power line 56. The secondary junction box 60 further includes a thermostat 64 electrically connected to the secondary terminal strip 62. The thermostat 64 is programmable to a temperature range or cut-off temperature. When ambient temperatures are below the temperature range or cut-off temperature, the thermostat 64 delivers power received through the secondary terminal strip 62. When ambient temperatures are at or above the temperature range or cut-off temperature, the thermostat 64 does not deliver power received through the secondary terminal strip 62. The secondary junction box 60 may also include a hinged door for easy access by the vehicle operator.

In an alternate embodiment, the relay system 12 may include a single junction box combining the components and functions of the relay junction box 50 and the secondary junction box 60.

Figure 7:
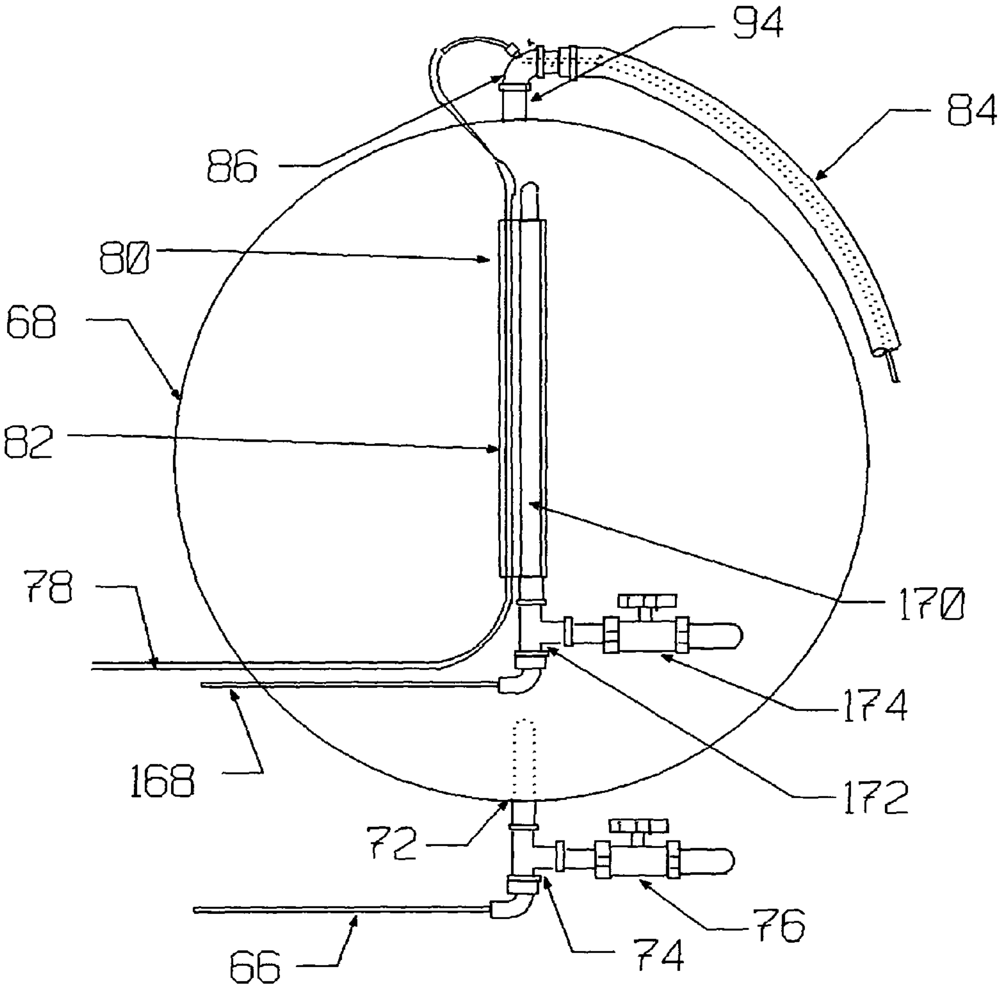
FIG. 7 is a side, partial cross-sectional view of a fluid holding tank and a sight glass.

Referring now to FIGS. 4 and 7, the at least one heating cable 16 includes a first heating cable 66 configured to heat a fluid holding tank 68. In the preferred embodiment, the first heating cable 66 transmits power to an immersion heater 70 operationally located within the fluid holding tank 68. The first heating cable 66 is electrically connected to the secondary terminal strip 62 in the secondary junction box 60. The first heating cable 66 is most preferably standard two-wire grounded, insulated electrical wire. The standard two-wire grounded, insulated electrical wire may be of various gauges and ratings, but is most preferably #16 stranded copper wire rated for 120 volt service.

The immersion heater 70 is preferably inserted into the fluid holding tank 68 through a fluid exit port 72 located on the fluid holding tank 68. More specifically, a standard pipe t-fitting 74 is threadably connected to the fluid exit port 72 and the immersion heater 70 is threadably inserted through the standard pipe t-fitting 74 and into the fluid holding tank 68 to enable heating of the fluid inside the fluid holding tank 68. The standard pipe t-fitting 74 may also be connected to a standard fluid control valve 76 for controlling the level of fluid in the fluid holding tank 68.

The immersion heater 70 may be of various ratings to supply sufficient power to the fluid holding tank 68 to prevent the fluid inside from freezing in below freezing ambient conditions, but is most preferably rated at 400 Watts.

Referring now to FIGS. 4 and 7, the at least one heating cable 16 may optionally include a second heating cable 78 electrically connected to the thermostat 64 in the secondary junction box 60. The second heating cable 78 is then operationally located adjacent to a sight glass 80 configured to indicate the level of fluid in the fluid holding tank 68. Most preferably, a sight glass encasement tube 82 is operationally located around the sight glass 80. The sight glass encasement tube 82 may be constructed of any durable, weather resistant material, but is most preferably constructed of a clear plastic material to enable unobstructed visual inspection of the sight glass 80. The second heating cable 78 is positioned between the sight glass 80 and the sight glass encasement tube 82 to deliver sufficient power to prevent fluid within the sight glass 80 from freezing and causing damaging the sight glass 80 in below freezing ambient conditions.

Figure 8:
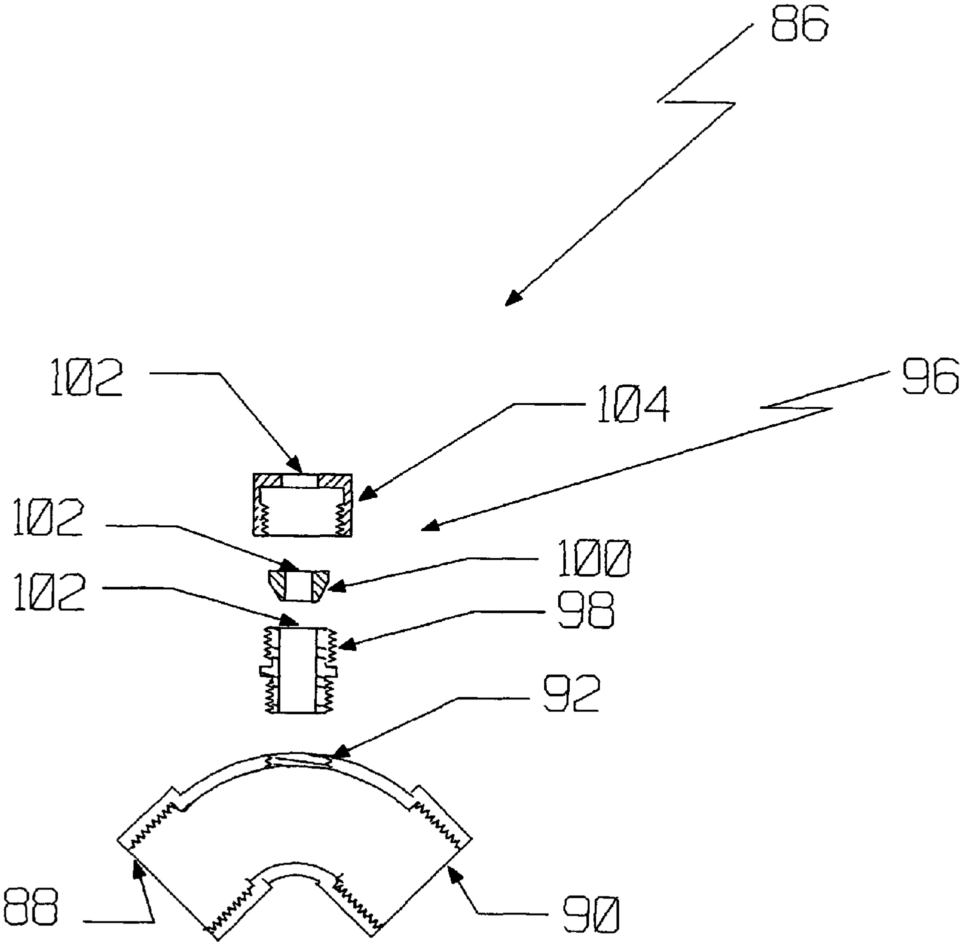
FIG. 8 is a side, cross-sectional, deconstructed view of a thimble connection assembly.

Referring now to FIGS. 7 and 8, the second heating cable 78 is then configured to heat a fluid exit line 84. More particularly, the second heating cable 78 is operationally connected to the fluid holding tank 68 through a thimble connection assembly 86. The thimble connection assembly 86 is made of a durable material and provides a means of entry of both fluid and power into the fluid exit line 84. Preferably, the thimble connection assembly 86 is made of a brass alloy, molded PVC, or another similar durable, easily machinable material. The thimble connection assembly 86 is provided with a threaded input end 88, a threaded output end 90 for receiving the fluid exit line 84, and a threaded cable receiving end 92 for receiving the second heating cable 78. The threaded input end 88 is threadably connected to a fluid exit line port 94 located on the fluid holding tank 68. The threaded output end 90 is threadably connected to the fluid exit line 84.

The thimble connection assembly 86 is further provided with a cable adapter apparatus 96 for insertion of the second heating cable 78. The cable adapter apparatus 96 is threadably connected to the threaded cable receiving end 92 of the thimble connection assembly 86. The cable adapter apparatus 96 may comprise a compression fitting 98, a tapered washer 100 provided with a heating cable receiving opening 102, and a compression nut 104. The compression fitting 98 and the compression nut 104 may be constructed of any rigid, durable material, but are most preferably constructed out of a brass alloy, molded PVC, or another similar durable, easily machinable material. The tapered washer 100 may be constructed of any semi-rigid, durable material, but is most preferably constructed out of rubber or plastic. The tapered washer 100 provides a leak-free entry point for the second heating cable 78 into the thimble connection assembly 86 and into the fluid exit line 84. Furthermore, the tapered washer 100 holds the second heating cable 78 in place, ensuring accurate placement of the second heating cable 78 and efficient heat transfer into the fluid in the fluid exit line 84. The tapered washer 100 also ensures safety of the operator by preventing the fluid from leaving the thimble connection assembly and coming into contact with a live electrical element in the environment, which could cause electrical shock to the operator.

The compression fitting 98 is threadably connected to the threaded cable receiving end 92 of the thimble connection assembly 86. The tapered washer 100 is located substantially within the compression fitting 98. The compression nut 104 is threadably connected to the compression fitting 98 and is located substantially around the tapered washer 100.

In an alternative embodiment, the thimble connection assembly 86 may be manufactured to incorporate the compression fitting 98 into the cable receiving end 92 of the thimble connection assembly 86. In this embodiment, the tapered washer 100 is located substantially within the cable receiving end 92 of the thimble connection assembly 86. The compression nut 104 is threadably connected to the cable receiving end 92 of the thimble connection assembly 86 and is located substantially around the tapered washer 100.

In a preferred embodiment, the second heating cable 78 is operationally positioned within the threaded cable receiving end 92 and threaded output end 90 of the thimble connection assembly 86 and within the fluid exit line 84. The fluid exit line 84 is extendable by attaching a second fluid exit line 106 through a connection assembly 108 that receives the second heating cable 78. In this embodiment, the connection assembly 108 is threadably connected to the fluid exit line 84 and the second fluid exit line 106. The second heating cable 78 is operationally positioned within the connection assembly 108 and within the second fluid exit line 106. The connection assembly 108 may be any standard pipe connection fitting, but is most preferably a standard pipe t-fitting, which is then threadably connected to a first fluid dispensing valve 110. The first fluid dispensing valve 110 may function as a control valve or a relief valve, but preferably functions as a relief valve.

Figure 6:
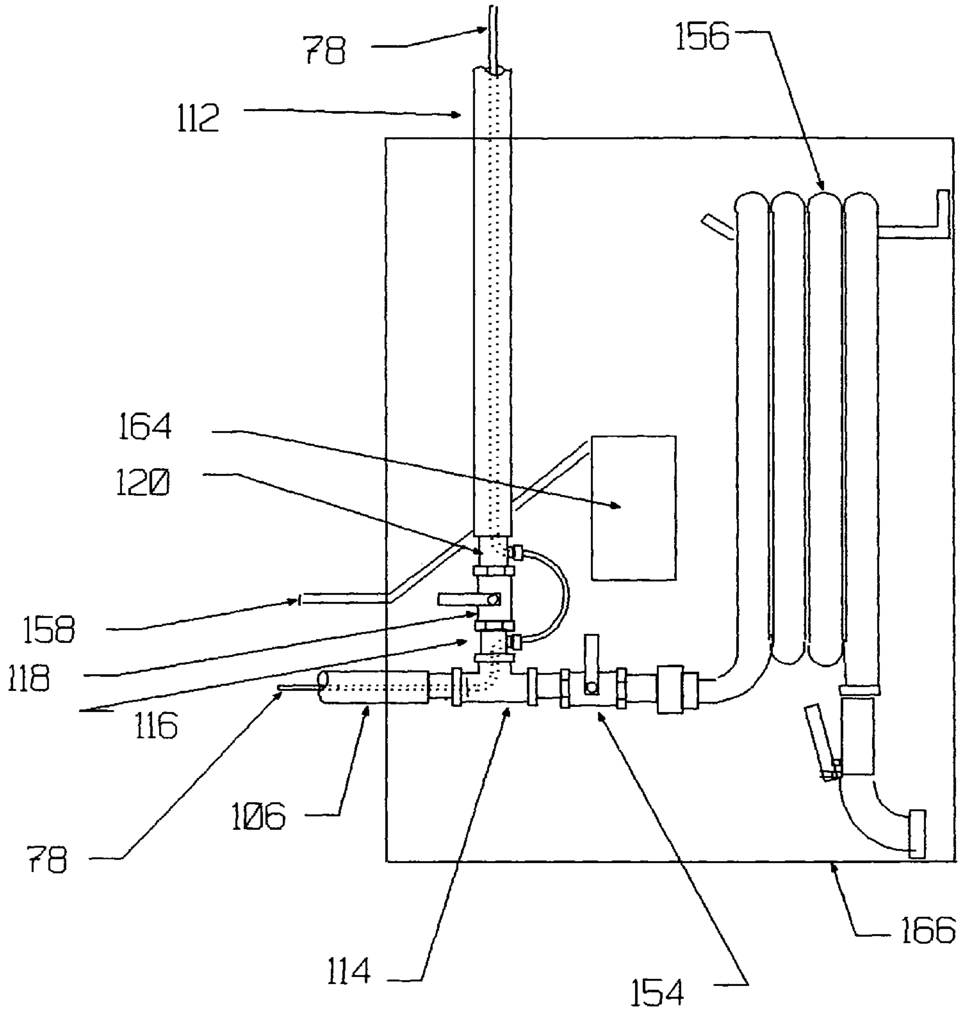
FIG. 6 is a side, partial cross-sectional view of a second fluid dispensing junction box.

Now referring to FIG. 6, the second fluid exit line 106 is extendable by attaching a third fluid exit line 112 through a second connection assembly 114. More particularly, the second fluid exit line 106 is threadably connected to the second connection assembly 114, which is then threadably connected to a pre-valve thimble assembly 116. The pre-valve thimble assembly 116 is threadably connected to a second fluid dispensing valve 118, which is then threadably connected to a post-valve thimble assembly 120. Finally, the post-valve thimble assembly 120 is threadably connected to the third fluid exit line 112. The second connection assembly 114 may be any standard pipe connection fitting, but is most preferably a standard pipe t-fitting. The second fluid dispensing valve 118 may function as a control valve or a relief valve, but preferably functions as a control valve for the third fluid exit line 112.

Figure 9:
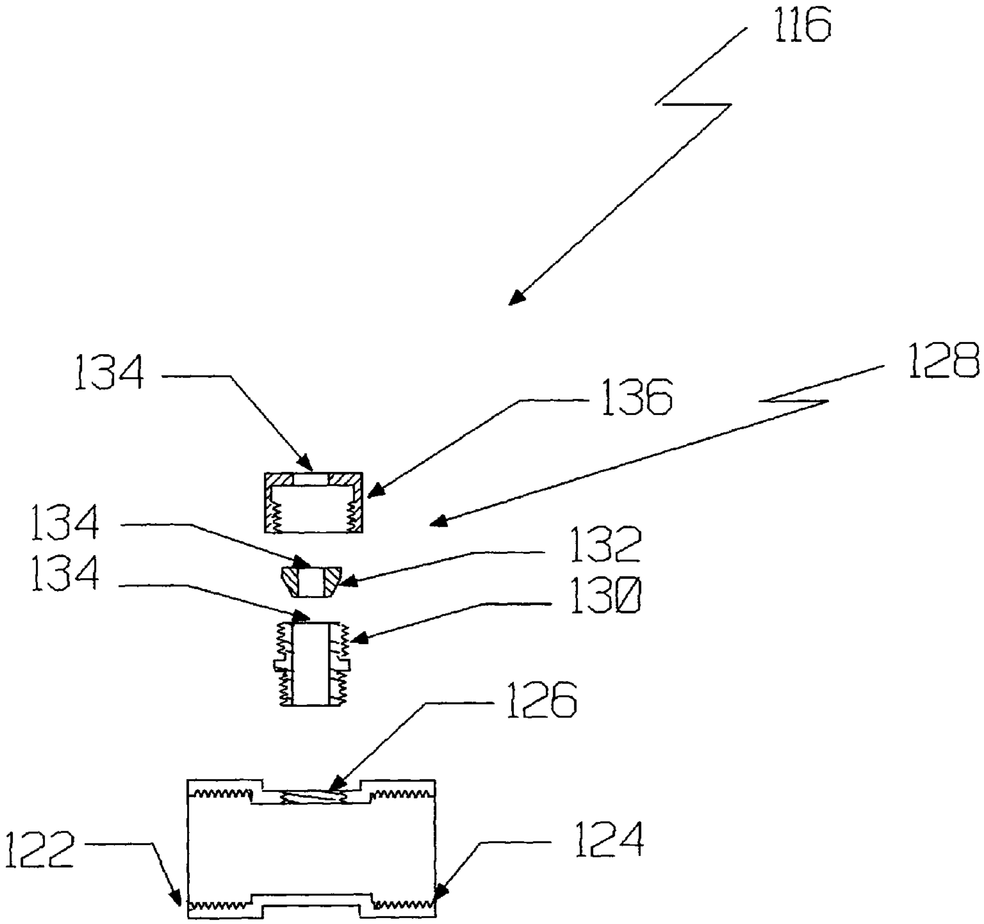
FIG. 9 is a side, cross-sectional, deconstructed view of a pre-valve thimble connection assembly.

Now referring to FIGS. 6 and 9, the pre-valve thimble connection assembly 116 is made of a durable material and provides a means for the second heating cable 78 to exit the second fluid exit line 106 before the second fluid dispensing valve 118. Preferably, the pre-valve thimble connection assembly 116 is made of a brass alloy, molded PVC, or another similar durable, easily machinable material. The pre-valve thimble connection assembly 116 is provided with a pre-valve thimble threaded input end 122, a pre-valve thimble threaded output end 124, and a threaded cable output end 126 for receiving the second heating cable 78. The pre-valve thimble threaded input end 122 is threadably connected to the second connection assembly 114. The pre-valve thimble threaded output end 124 is threadably connected to the second fluid dispensing valve 118.

The pre-valve thimble connection assembly 116 is further provided with a cable adapter apparatus 128 as a means for the second heating cable 78 to exit the second fluid exit line 106. The cable adapter apparatus 128 is threadably connected to the threaded cable output end 126 of the pre-valve thimble connection assembly 116. The cable adapter apparatus 128 may comprise a compression fitting 130, a tapered washer 132 provided with a heating cable output opening 134, and a compression nut 136. The compression fitting 130 and the compression nut 136 may be constructed of any rigid, durable material, but are most preferably constructed out of a brass alloy, molded PVC, or another similar durable, easily machinable material. The tapered washer 132 may be constructed of any semi-rigid, durable material, but is most preferably constructed out of rubber or plastic. The tapered washer 132 provides a leak-free exit point for the second heating cable 78 from the pre-valve thimble connection assembly 116 and out of the second fluid exit line 106. Furthermore, the tapered washer 132 holds the second heating cable 78 in place, ensuring accurate placement of the second heating cable 78 and efficient heat transfer into the fluid in the second fluid exit line 106. The tapered washer 132 also ensures safety of the operator by preventing the fluid from leaving the pre-valve thimble connection assembly 116 and coming into contact with a live electrical element in the environment, which could cause electrical shock to the operator.

The compression fitting 130 is threadably connected to the threaded cable output end 126 of the pre-valve thimble connection assembly 116. The tapered washer 132 is located substantially within the compression fitting 130. The compression nut 136 is threadably connected to the compression fitting 130 and is located substantially around the tapered washer 132.

In an alternative embodiment, the pre-valve thimble connection assembly 116 may be manufactured to incorporate the compression fitting 130 into the threaded cable output end 126 of the pre-valve thimble connection assembly 116. In this embodiment, the tapered washer 132 is located substantially within the threaded cable output end 126 of the pre-valve thimble connection assembly 116. The compression nut 136 is threadably connected to the threaded cable output end 126 of the pre-valve thimble connection assembly 116 and is located substantially around the tapered washer 132.

Figure 10:
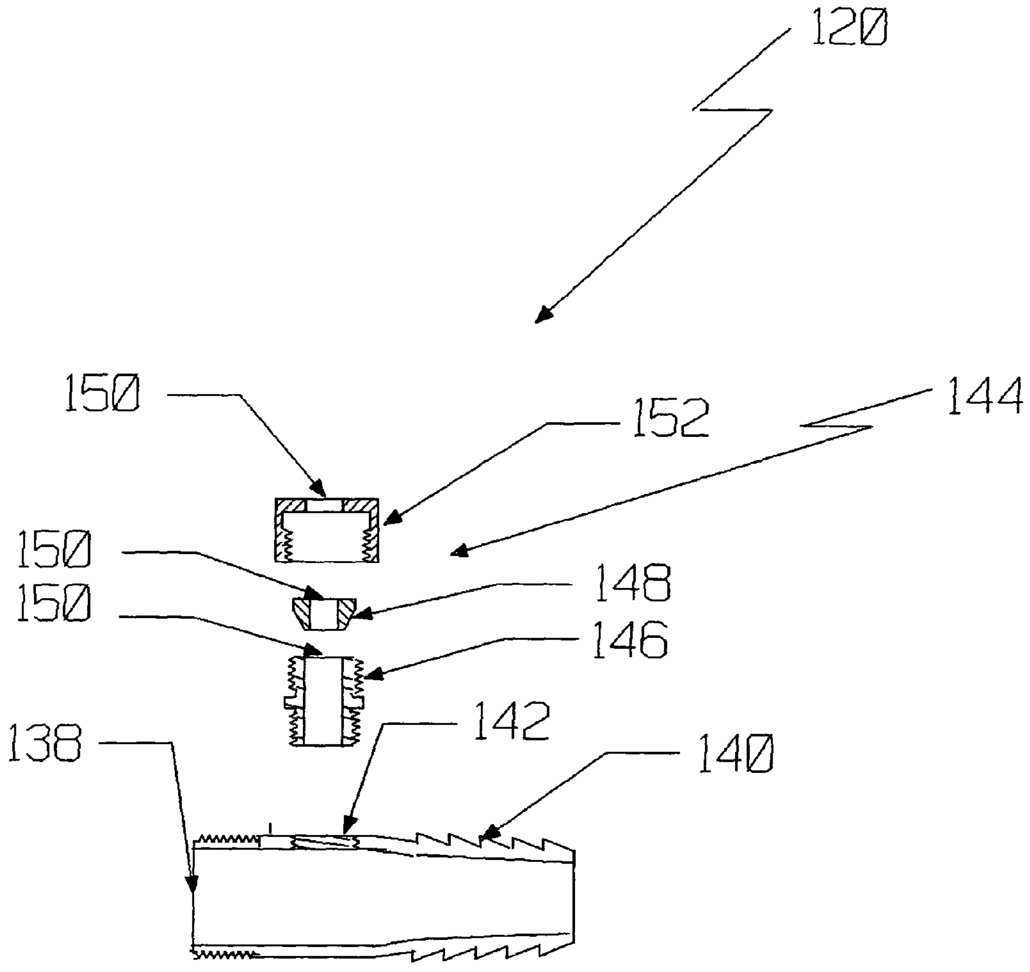
FIG. 10 is a side, cross-sectional, deconstructed view of a post-valve thimble connection assembly.

Now referring to FIGS. 6 and 10, the post-valve thimble connection assembly 120 is made of a durable material and provides a means of entry of the second heating cable 78 the third fluid exit line 112. Preferably, the post-valve thimble connection assembly 120 is made of a brass alloy, molded PVC, or another similar durable, easily machinable material. The post-valve thimble connection assembly 120 is provided with a post-valve thimble threaded input end 138, a post-valve thimble threaded output end 140 for receiving the third fluid exit line 112, and a threaded cable input end 142 for receiving the second heating cable 78. The post-valve thimble threaded input end 138 is threadably connected to the second fluid dispensing valve 118. The post-valve thimble threaded output end 140 is threadably connected to the third fluid exit line 112.

The post-valve thimble connection assembly 120 is further provided with a cable adapter apparatus 144 for insertion of the second heating cable 78. The cable adapter apparatus 144 is threadably connected to the threaded cable input end 138 of the post-valve thimble connection assembly 120. The cable adapter apparatus 144 may comprise a compression fitting 146, a tapered washer 148 provided with a heating cable input opening 150, and a compression nut 152. The compression fitting 146 and the compression nut 152 may be constructed of any rigid, durable material, but are most preferably constructed out of a brass alloy, molded PVC, or another similar durable, easily machinable material. The tapered washer 148 may be constructed of any semi-rigid, durable material, but is most preferably constructed out of rubber or plastic. The tapered washer 148 provides a leak-free entry point for the second heating cable 78 into the post-valve thimble connection assembly 120 and into the third fluid exit line 112. Furthermore, the tapered washer 148 holds the second heating cable 78 in place, ensuring accurate placement of the second heating cable 78 and efficient heat transfer into the fluid in the third fluid exit line 112. The tapered washer 148 also ensures safety of the operator by preventing the fluid from leaving the post-valve thimble connection assembly 120 and coming into contact with a live electrical element in the environment, which could cause electrical shock to the operator.

The compression fitting 146 is threadably connected to the threaded cable input end 142 of the post-valve thimble connection assembly 120. The tapered washer 148 is located substantially within the compression fitting 146. The compression nut 152 is threadably connected to the compression fitting 146 and is located substantially around the tapered washer 148.

In an alternative embodiment, the post-valve thimble connection assembly 120 may be manufactured to incorporate the compression fitting 146 into the threaded cable input end 142 of the post-valve thimble connection assembly 120. In this embodiment, the tapered washer 148 is located substantially within the threaded cable input end 142 of the post-valve thimble connection assembly 120. The compression nut 152 is threadably connected to the threaded cable input end 142 of the post-valve thimble connection assembly 120 and is located substantially around the tapered washer 148.

Now referring to FIGS. 6, 9, and 10, the second heating cable 78 is operationally positioned within the pre-valve thimble threaded input end 122 and threaded cable output end 126 of the pre-valve thimble connection assembly 116, within the threaded cable input end 142 and post-valve thimble threaded output end 140 of the post-valve thimble connection assembly 120, and within the third fluid exit line 112.

The second connection assembly 114 may be threadably connected to additional fittings, which may be threadably connected to additional fluid exit lines. As shown in FIG. 6, the second connection assembly 114 may be threadably connected to a spray line control valve 154, which may then be threadably connected to a fourth fluid exit line 156, which can be used as a spray line for cleaning.

The second heating cable 78 is standard waterproof heating cable and may be of various ratings to supply sufficient power to the fluid exit line 84, the second fluid exit line 106, and, if needed, the third fluid exit line 112 to prevent the fluid inside from freezing in below freezing ambient conditions. The second heating cable may be rated for between 1 Watt per foot and 10 Watts per foot of power supply, but is most preferably rated for approximately 5 Watts per foot.

The fluid exit line 84, second fluid exit line 106, and third fluid exit line 112 are made of a flexible, durable material, preferably a plastic or polymeric resin material. The fluid exit lines may vary in length, diameter, and thickness, but are preferably commercial fluid delivery hoses with 1 inch diameters, or another commercially available size. The fluid exit lines may be of any length; however, commercially available lengths are preferred between 10 feet and 100 feet in length. The fluid exit lines may be of standard, medium, or heavy duty grade, but are most preferably standard grade.

Figure 5:
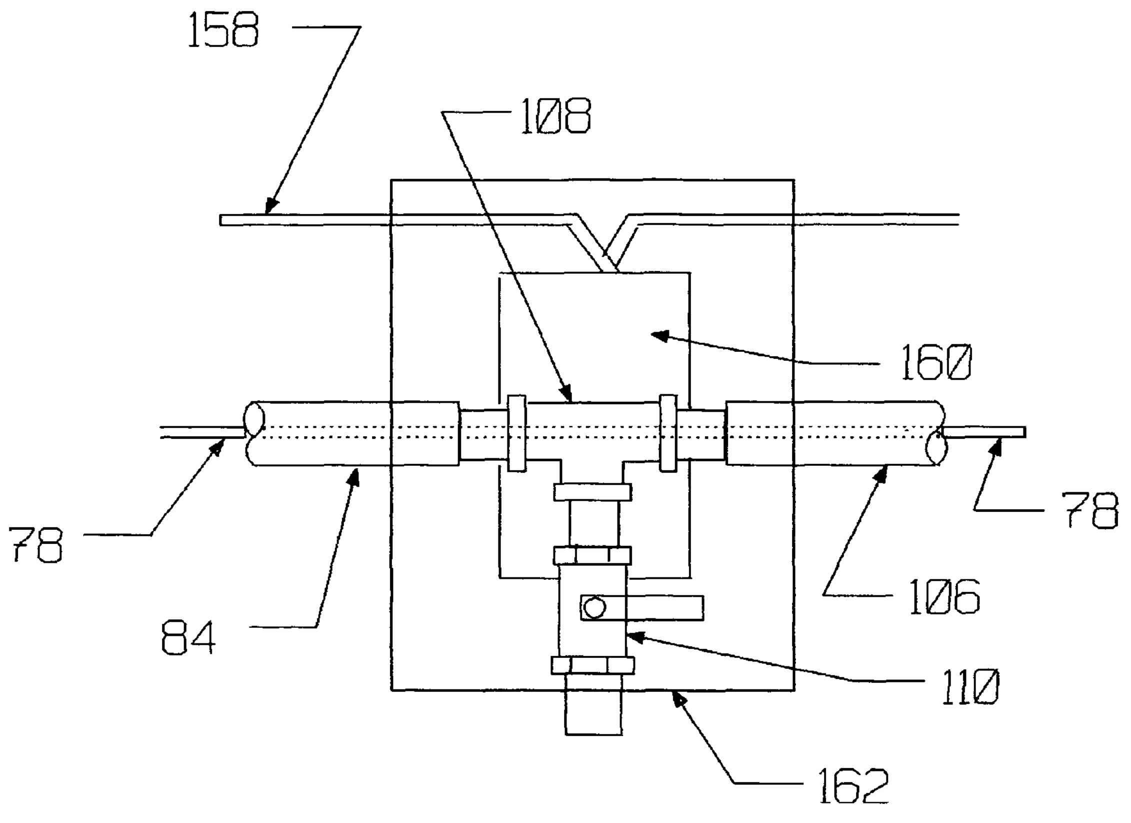
FIG. 5 is a side, partial cross-sectional view of a first fluid dispending junction box.

Referring now to FIGS. 4-6, in an optional embodiment, the at least one heating cable 16 includes a third heating cable 158 electrically connected to the thermostat 64 in the secondary junction box 60. The third heating cable is most preferably standard two-wire grounded, insulated electrical wire. The standard two-wire grounded, insulated electrical wire may be of various gauges and ratings, but is most preferably #16 stranded copper wire rated for 120 volt service.

The third heating cable 158 is configured for heating vehicle accessory equipment. The vehicle accessory equipment preferably includes a first heating pad 160 located at a first fluid dispensing junction box 162, which is operationally located around the connection assembly 108 and the first fluid dispensing valve 110. The vehicle accessory equipment preferably also includes a second heating pad 164 located at a second fluid dispensing junction box 166, which is operationally located around the second connection assembly 114, the pre-valve thimble connection assembly 116, the second fluid dispensing valve 118, and the post-valve thimble connection assembly 120. More specifically, the third heating cable 158 is electrically connected to the first heating pad 160 and the second heating pad 164.

The first heating pad 160 and second heating pad 164 may be of various ratings to supply sufficient power and heat to prevent the first fluid dispensing valve 110 and second fluid dispensing valve 118 from freezing and becoming damaged in below freezing ambient conditions, but are most preferably 50 Watt heating pads. The first fluid dispensing junction box 162 and second fluid dispensing junction box 166 are constructed to trap and retain heat generated by the first heating pad 160 and second heating pad 164 respectively. The first fluid dispensing junction box 162 and second fluid dispensing junction box 166 may be constructed of any durable, weather-resistant material, but are most preferably constructed of a plastic material. The first fluid dispensing junction box 162 and second fluid dispensing junction box 166 may also include hinged doors for easy access by the vehicle operator.

Referring now to FIGS. 4 and 7, the at least one heating cable 16 includes a fourth heating cable 168 electrically connected to the thermostat 64 in the secondary junction box 60. The fourth heating cable 168 is most preferably standard two-wire grounded, insulated electrical wire. The standard two-wire grounded, insulated electrical wire may be of various gauges and ratings, but is most preferably #16 stranded copper wire rated for 120 volt service.

The fourth heating cable 168 is configured for heating the sight glass 80. The fourth heating cable 168 is electrically connected to a sight glass heater 170, which is preferably inserted into the sight glass 80. More specifically, a standard pipe t-fitting 172 may be threadably connected to the sight glass 80 and the sight glass heater 170 may be threadably inserted through the standard pipe t-fitting 172 and into the sight glass 80 to enable heating of the fluid inside the sight glass 80. The standard pipe t-fitting 172 may also be connected to a sight glass fluid control valve 174 for controlling the level of fluid in the sight glass 80.

The sight glass heater 170 may be of various ratings to supply sufficient power to prevent the fluid inside the sight glass 80 from freezing and damaging the sight glass 80 in below freezing ambient conditions, but is most preferably a 400 Watt immersion heater.

Figure 11:
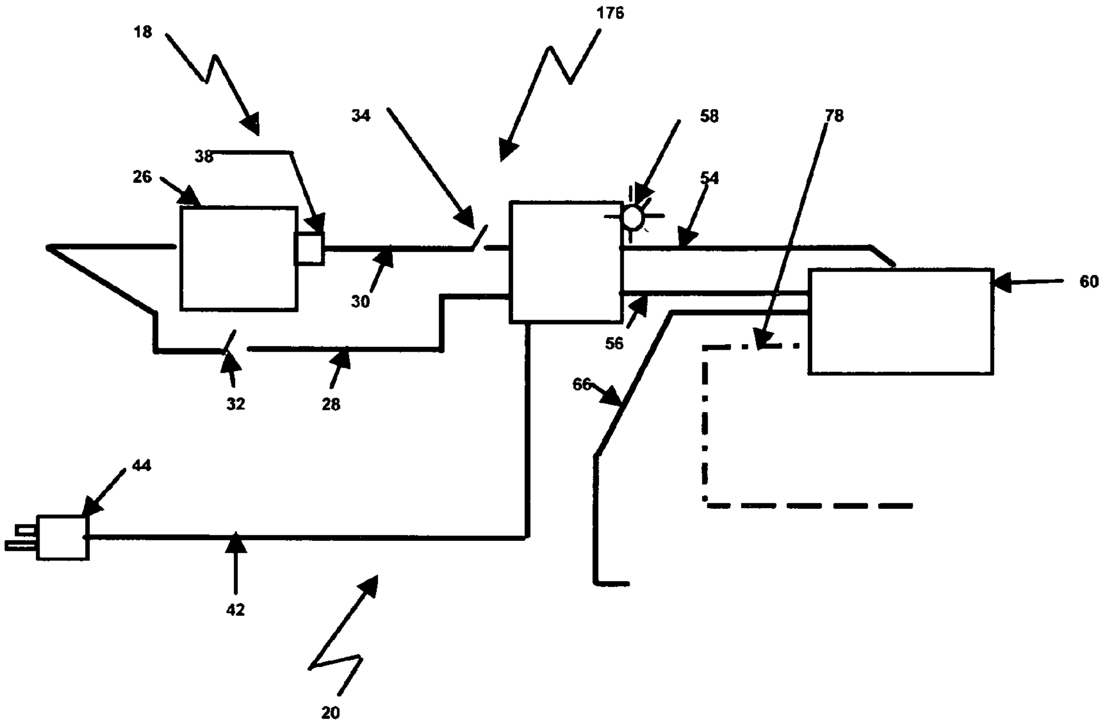
FIG. 11 is a block electrical diagram showing the elements of a heating assembly kit as an alternative embodiment.

Now referring to FIGS. 2 and 11, in an alternative embodiment, the present invention may be presented as a heating assembly kit 176 for converting a fluid bearing structure on a vehicle into a heatable fluid bearing structure. The heating assembly kit 176 generally comprises a relay system 12 for receiving power and distributing electrical currents, a power inverter 26 in an electrical relationship to the relay system 12, a house power cord 42 in an electrical relationship to the relay system 12, and at least one heating cable 16 for receiving electrical currents distributed from the relay system 12. In a preferred embodiment, the at least one heating cable 16 includes a first heating cable 66 and a second heating cable 78 extending from the relay system 12. The first heating cable 66 is most preferably insulated electrical wire and is configured to heat a fluid holding tank 68. The second heating cable is most preferably waterproof heating cable and is configured to heat a fluid exit line 84. The at least one heating cable 16 may further include a third heating cable 158 extending from the relay system 12 and configured for heating vehicle accessory equipment and a fourth heating cable 168 extending from the relay system 12 and configured for heating a sight glass 80.

The heating assembly kit 176 may further comprise a thimble connection assembly 86 configured to receive the second heating cable 78 through a heating cable receiving opening 102, as described in detail above.

The relay system 12, power inverter 26, house power cord 42, and at least one heating cable 16 preferably contain the components and features described above in detail. The components of the heating assembly kit 176 are also connectable to a vehicle as described above.

While several particular embodiments of the present transportable heating assembly have been described herein, it will be appreciated by those skilled in the art that changes and modifications may be made thereto without departing from the invention in its broader aspects and as set forth in the following claims.

What is claimed is:

1. A transportable heating assembly for converting a liquid bearing structure on a vehicle into a heatable liquid bearing structure, the transportable heating assembly comprising:

a relay system for receiving power and distributing electrical currents;

a power system for supplying power to said relay system;

a first heating cable in an electrical relationship to said relay system connected to an immersion heater for preventing a liquid within a fluid holding tank from freezing; and a second heating cable configured to heat a fluid exit line extending from said fluid holding tank that is inserted into said fluid exit line through a thimble connection assembly from an external position outside of said fluid exit line; wherein said second heating cable heats liquid within said fluid exit line while submerged within the liquid and the length of the submerged said second heating cable is adjustable within said fluid exit line at said thimble connection assembly.

2. The transportable heating assembly of claim 1, wherein said power system comprises a vehicle power system.

3. The transportable heating assembly of claim 2, wherein said vehicle power system includes a vehicle battery, a vehicle alternator, and a power inverter in an electrical relationship to said relay system.

4. The transportable heating assembly of claim 3, wherein said vehicle power system is activated by an ignition key switch.

5. The transportable heating assembly of claim 1, wherein said power system comprises a house power system.

6. The transportable heating assembly of claim 5, wherein said house power system includes a house power cord.

7. The transportable heating assembly of claim 1, wherein said relay system is configured to receive power from a vehicle power system and a house power system.

8. The transportable heating assembly of claim 7, wherein said power system is further provided with at least one ground fault circuit interrupter.

9. The transportable heating assembly of claim 1, wherein said relay system is provided with a power active indicator.

10. The transportable heating assembly of claim 1, wherein said fluid exit line is extendable by attaching a second fluid exit line through a connection assembly that receives said second heating cable.

11. The transportable heating assembly of claim 1, wherein said second heating cable is operationally positioned for heating a sight glass configured to indicate the level of fluid in said fluid holding tank.

12. The transportable heating assembly of claim 1, wherein a third heating cable of said at least one heating cable is configured for heating vehicle accessory equipment.

13. The transportable heating assembly of claim 12, wherein said vehicle accessory equipment includes a heating pad found at a first fluid dispensing junction box.

14. The transportable heating assembly of claim 1, wherein said thimble connection assembly is provided with a threaded output end for receiving said fluid exit line, a threaded input end and a heating cable receiving opening.

* * * * *